United States Patent [19]

Stark et al.

[11] Patent Number: 5,237,173

[45] Date of Patent: Aug. 17, 1993

[54] GAIN CALIBRATION IN A SCINTILLATION CAMERA

[75] Inventors: Iain Stark, Dollard des Ormeaux; Abel Ferreira, Pointe-Claire; James Anglehart, Montreal, all of Canada

[73] Assignee: Independent Scintillation Imaging Systems, Inc., Quebec, Canada

[21] Appl. No.: 861,636

[22] Filed: Apr. 1, 1992

[51] Int. Cl.$^5$ .................... G01T 1/208; G01T 1/20
[52] U.S. Cl. ................. 250/252.1; 250/207; 250/363.07; 250/363.09; 250/369
[58] Field of Search ............. 250/363.09, 252.1 A, 250/252.1 R, 207, 363.07, 369

[56] References Cited

U.S. PATENT DOCUMENTS

| | | | |
|---|---|---|---|
| 3,900,731 | 8/1975 | Chevalier et al. | 250/207 |
| 4,047,034 | 9/1977 | Auphan | 250/354.1 |
| 4,079,257 | 3/1978 | Jatteau et al. | 250/363.07 |
| 4,272,677 | 6/1981 | Berthold et al. | 250/252.1 |
| 4,516,025 | 5/1985 | Yamakawa et al. | 250/252.1 |
| 4,517,460 | 5/1985 | Meulenbrugge et al. | 250/252.1 |
| 4,583,187 | 4/1986 | Stoub | 364/571.02 |
| 4,605,856 | 8/1986 | Persyk et al. | 250/363.07 |
| 4,611,117 | 9/1986 | Seibert et al. | 250/252.1 |
| 4,882,495 | 11/1989 | Tanaka | 250/363.09 |
| 5,004,904 | 4/1991 | Yamakawa et al. | 250/207 |

FOREIGN PATENT DOCUMENTS 0066763 12/1982 European Pat. Off. .
0450388 10/1991 European Pat. Off. ............. 250/369

Primary Examiner—Constantine Hannaher
Attorney, Agent, or Firm—Marks & Murase

[57] ABSTRACT

The scintillation camera includes a plurality of individually pulsible light emitting devices associated with a number of the photomultiplier tubes. By pulsing the light emitting device, certain ones of the photomultiplier tubes of the camera receive substantial amounts of light. Values from the certain photomultiplier tubes are compared to one another for carrying out an effective gain adjustment of at least one of the certain tubes. The gain calibration is independent of the amount of light emitted from the light emitting devices. There is also provided a method of adjusting the effective gain of the camera by using the readings resulting from a gamma ray induced scintillation instead of the pulsible light emitting devices.

9 Claims, 3 Drawing Sheets

GAIN CALIBRATION IN A SCINTILLATION CAMERA

FIELD OF THE INVENTION

The present invention relates to a method and apparatus for gain calibration in a scintillation camera.

BACKGROUND OF THE INVENTION

Scintillation cameras or gamma cameras are well known in the art and are used primarily in medical diagnostics for obtaining images of the internal organs or tissues of a patient who has ingested a trace amount of a radioactive isotope. The conventional construction for such cameras is to provide an array of highly sensitive photomultiplier tubes which are optically coupled to a scintillation crystal which will create a small flash of light in response to interaction with incident gamma rays. Each tube has a relatively large surface area, namely greater than 30 cm$^2$, and therefore to determine the exact position of a scintillation, means are used to calculate the position based on intensity values from at least three photomultiplier tubes. Obviously, the accuracy of the calculated positions of the events is strongly dependent on the accuracy of the gain calibration of each photomultiplier tube. Small errors in gain calibration will cause blurring or distortion in the medical diagnostic image.

It is therefore an object of the present invention to provide a method and apparatus which will quickly carry out a gain calibration for each photomultiplier tube in order to improve the quality of the resulting images. It is furthermore an object of the present invention to provide a method and apparatus for carrying out a gain calibration in a scintillation camera which does not add substantially to the cost of the camera system.

SUMMARY OF THE INVENTION

According to the invention there is provided a scintillation camera for obtaining a distribution image of incident gamma rays from a subject. The camera has a scintillator for emitting flashes of light due to incident gamma rays, and a plurality of photomultiplier tubes optically coupled with the scintillator for converting the light flashes into respective electric signals which are individually detectable. The camera further comprises: a plurality of pulsible light means associated with a number of the tubes such that each tube not associated with the light means has at least one neighboring tube provided with the light means, the plurality of light means being individually pulsible, pulsing means for pulsing each of the light means and gain calibration means for reading a subset of the respective electric signals of photomultiplier tubes having received light from the light means pulsed, and carrying out an effective gain adjustment of at least one of the photomultiplier tubes whose respective electric signal has been read, based on a comparison of values of the subset of respective electric signals.

According to a first aspect of the invention there is provided a method of adjusting an effective gain of a plurality of photomultiplier tubes in a scintillation camera which is used for obtaining a distribution image of incident gamma rays from a subject. The camera has a scintillator for emitting flashes of light due to incident gamma rays, and the plurality of photomultiplier tubes optically coupled with the scintillator for converting the light flashes into respective electric signals. The respective electric signals are individually readable, and each of the plurality of photomultiplier tubes has an initial gain which is set to provide a preset level of respective electric signal when a precalibrated gamma radiation source is placed at a predetermined position near the scintillator with respect to each photomultiplier tube. The method comprises the steps of providing a short duration pulse of light to the scintillator proximate to a given photomultiplier tube; measuring the respective electric signals from the given photomultiplier tube and from a number of other photomultiplier tubes surrounding the given photomultiplier tube, comparing values of the respective electric signals measured with each other and with stored values of the respective electric signals obtained when initial calibration was done, and adjusting the effective gain of at least one tube chosen from the group of the given tube and the surrounding tubes. In this way, the effective gain can be adjusted substantially independently of the intensity or quantity of light provided to the given tube.

According to a second aspect of the present invention, there is provided a method of adjusting the effective gain of a plurality of photomultiplier tubes in a scintillation camera as described above, in which a source of gamma rays is provided in proximity to the scintillator, values of respective electric signals emanating from a central one of the tubes nearest a scintillation event as well as of a plurality of tubes surrounding the center tube are measured, an expected value of the signal for the center tube based on the values from the surrounding tubes is determined, the measured value from the center tube is compared with the expected value in the previous step, and the effective gain of the center tube is adjusted based on a comparison result obtained in the previous step.

DETAILED DESCRIPTION OF THE PREFERRED EMBODIMENT

Figure 1:
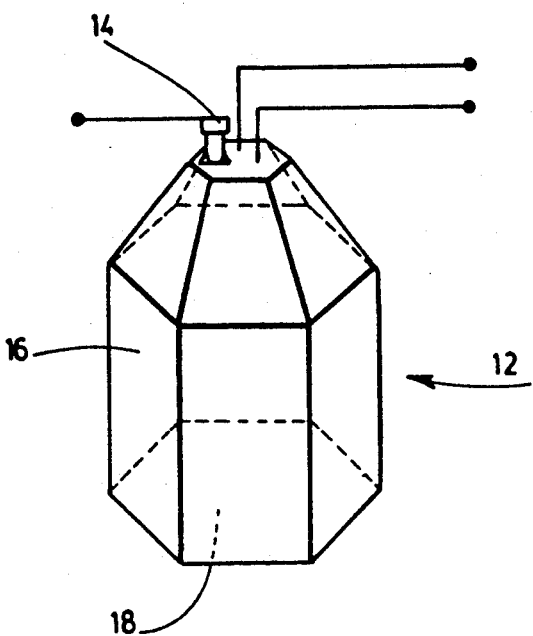
FIG. 1 is an oblique view of a photomultiplier tube provided with an LED in accordance with a preferred embodiment.
Figure 2:
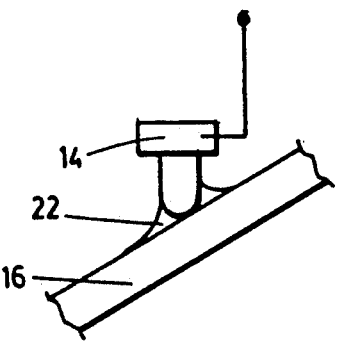
FIG. 2 is a partial sectional view of an LED optically coupled to the photomultiplier tube.

As shown in FIG. 1, a conventional hexagonal photomultiplier tube (12) has glass casing (16), a bottom window (18) and is provided with an LED (14) on its top surface. Light emitted from the LED (14) when pulsed is transmitted within the tube (12) and by internal reflection within the casing (16) until it strikes a thin translucent coating of photoelectrically sensitive material on an interior surface of window (18) of the tube (12) whose LED was pulsed and of its neighboring tubes (12). LED (14) is installed on tube (12) by epoxy (22), as shown in FIG. 2, in such a way that its light is substantially shielded from neighboring tubes (12), except for light which splashes over through window (18).

Figure 3:
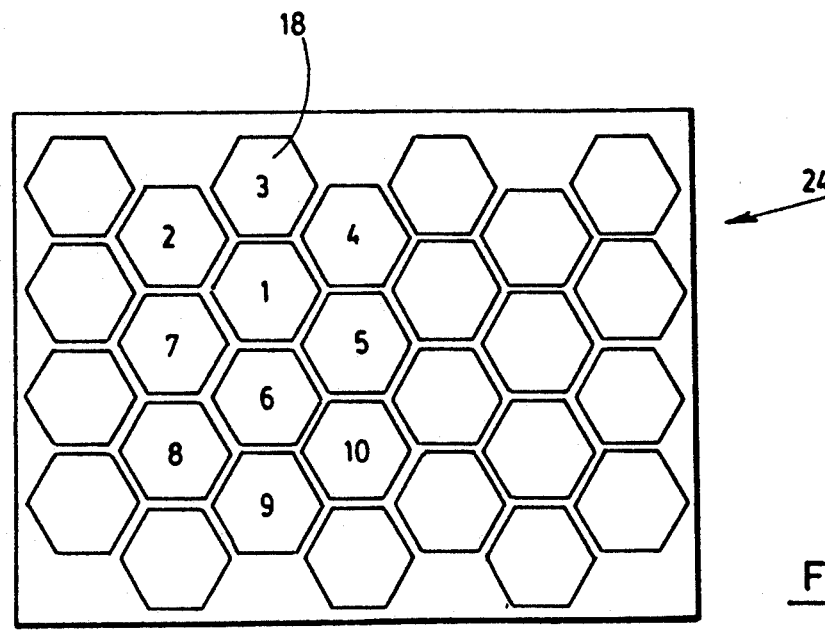
FIG. 3 is a sectional view from the bottom of a scintillation camera provided with hexagonal photomultiplier tubes.
Figure 4:
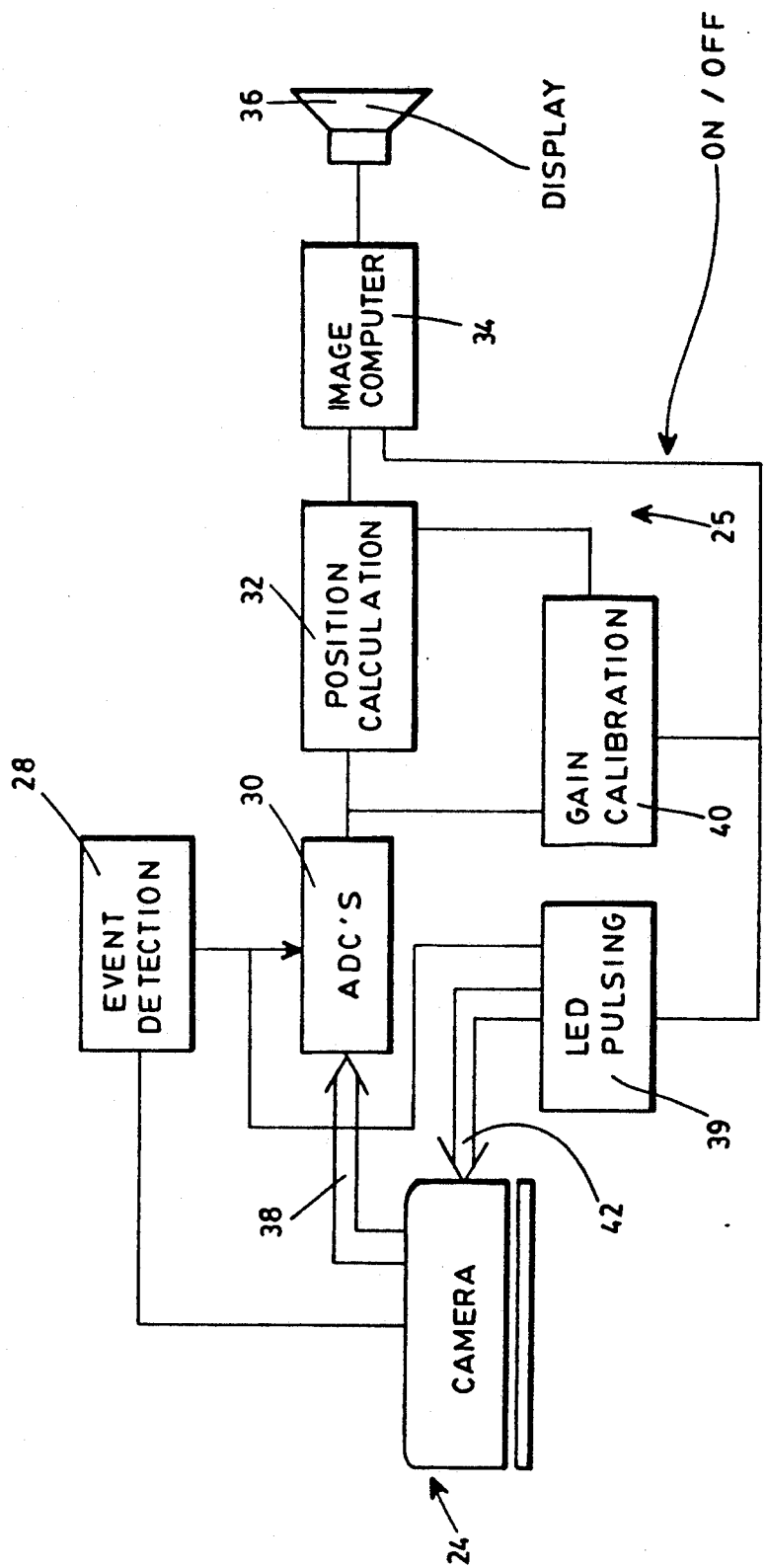
FIG. 4 is a block diagram of the scintillation camera system provided with gain calibration.
Figure 5:
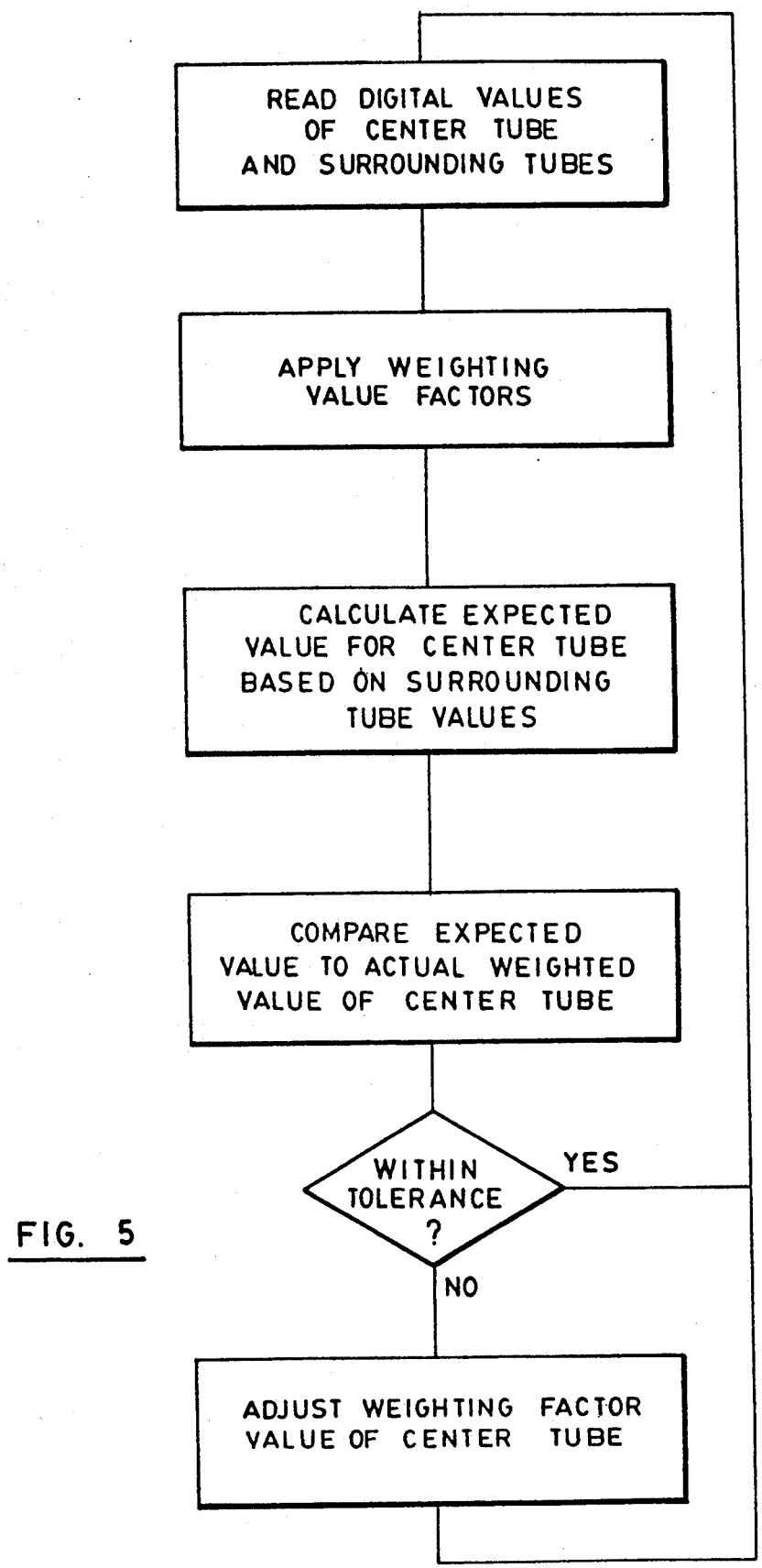
FIG. 5 is a flow chart illustrating a method of gain calibration according to a second embodiment.

As shown in FIG. 3, the hexagonal tubes (12) are packed in a matrix inside a camera head (24). A scintillator or scintillation crystal, well known in the art, is optically coupled to windows (18). When the scintillator receives a gamma ray with which it interacts, part of the energy of the gamma ray goes into stimulating the scintillator into producing a small flash of light. The tubes (12) register the intensity of light received with great sensitivity and produce an electrical signal responsive to the light intensity. By means of signal processing, the signals received are interpreted to produce position data of scintillations resulting from gamma rays emitted from specific isotopes. When a trace amount of a radioactive isotope is ingested by a medical patient, the camera head (24) is placed near a part of the patient to be imaged, and the imaging system (25) (see FIG. 4) will produce an image of the internal organs or tissues of the part.

Position calculation means (32) output position values of scintillation events resulting from gamma rays of the isotope interacting with the scintillator in camera (24). These position values are recorded in an image computer (34) to form an image which is viewed on a display (36).

Gain calibration according to the preferred embodiment is carried out by pulsing the LED (14) associated with a given tube (12) and reading values of signals generated by the given tube and its six surrounding neighboring tubes (12). Pulsing means (39) send pulsing signals over bus (42) to the LED (14) of the given tube (12). An example of the gain calibration is given with reference to FIG. 4 and to the tubes (12) numbered (1) through (10) in FIG. 3. The LED (14) associated with tube (1) is pulsed five times for about 100 nanoseconds (ns) each time. In this short pulse, enough light of a frequency sufficient to be detected by the tubes (12) is emitted which will give a near full signal on tube (1) without saturation, with about a third or half of a full signal on tubes (2) through (7). In a gain calibration mode set by the image computer (34), the pulsing means (39) and calibration means (40) indicate to the analog-to-digital conversion means (30) that conversion should take place, thus bypassing the event detection means (28). The ADC means (30) convert the signals on bus (38) coming from tubes (1) through (7) and provide the unadjusted digital values on its output to be received by the gain calibration means (40). The means (40) then determines if the ratios of the digital values from tubes (2) through (7) to the digital value from the given tube (1) agree with preset ratio values obtained when the camera was originally calibrated. If the ratios are consistently different from the expected ratio, then a signal from means (40) is sent to the position calculation means (32) to correct a weighting value associated with the given tube (1). Subsequent gain calibrations take into account the weighting values associated with each tube compare the computed ratio with a corrected ratio, being the expected ratio.

By using the ratios, the gain calibration means (40) function independently of the amount of the light given off during the pulses, which is advantageous since LED (14) may not always be stable. In the case of the example, the next tube whose gain is to be calibrated is tube (6), whose digital value is compared with the digital values from tubes (1),(5), and (7) through (10). Of course, all digital values are multiplied by their respective weighting values before being involved either in the above mentioned ratio calculations carried out by means (40) or the position calculation carried out by means (32).

Of course, it is possible to carry out gain calibration without providing an LED (14) on every tube (12), so long as every tube not provided with an LED has a neighbor that is.

In the digital system (25), it is easier to adjust tube gain by using weighting factor values, however, it is noted that electronic control of analog tube gain in the camera (24) is equally possible.

In the second embodiment, gain calibration is carried out according to a method which is implemented at any time during operation of the system (25). The gain calibration means (40) receive data just like the position calculation means (32), and the pulsing means (39) and LED's (14) are not required. For example, if a scintillation resulting from a gamma ray of the isotope takes place under the window (18) of tube (1), then the digital values of tubes (1) through (7) are converted and output by ADC means (30) after receiving the convert command by the event detection means (28). Means (32) accurately calculate the position of the scintillation within window (18) of tube (1) based on the digital values taking into consideration the weighting values. Means (40) calculate, based on the weighted digital values of tubes (2) through (7), what should be the intensity of light received by tube (1) and therefore what its expected weighted digital value should be. If there is any discrepancy between the expected value and the actual value from tube (1) then a change to its corresponding weighting value is effected in means (40) and in means (32).

Of course, the gain calibration means in the second embodiment can be incorporated into the position calculation means (32), although a separate function is carried out. It is also possible that limits in the computational speed of the position calculation means (32) may require separate means (40) for the gain calibration.

It is to be understood that the above detailed description is not intended to limit the scope of the invention as defined in the appended claims.

We claim:

1. A scintillation camera for obtaining a distribution image of incident gamma rays from a subject, the camera having a scintillator for emitting flashes of light due to incident gamma rays, a plurality of photomultiplier tubes optically coupled with said scintillator for converting the light flashes into respective electric signals which are individually detectable, the camera comprising:

a plurality of pulsible light means associated with a number of the tubes such that each tube not associated with the light means has at least one neighboring tube provided with the light means, the plurality of light means being individually pulsible;
   pulsing means for pulsing each of the light means, and
   gain calibration means for reading a subset of the respective electric signals of photomultiplier tubes having received light from the light means pulsed, and carrying out an effective gain adjustment of at least one of the photomultiplier tubes whose respective electric signal has been read, based on a comparison of values of the subset of respective electric signals.

2. Camera as claimed in claim 1, wherein the pulsible light means are associated with all of the photomultiplier tubes.

3. Camera as claimed in claim 1, wherein the pulsible light means comprise light emitting diodes.

4. Camera as claimed in claim 3, wherein the light emitting diodes are mounted on a rear of the photomultiplier tubes, a front of the photomultiplier tubes being optically coupled with the scintillator.

5. A method of adjusting an effective gain of a plurality of photomultiplier tubes in a scintillation camera which is used for obtaining a distribution image of incident gamma rays from a subject, the camera having a scintillator for emitting flashes of light due to incident gamma rays, the plurality of photomultiplier tubes optically coupled with the scintillator for converting the light flashes into respective electric signals, the respective electric signals being individually readable, each of said plurality of photomultiplier tubes having an initial gain which is set to provide a preset level of respective electric signal when a precalibrated gamma radiation source is placed at a predetermined position near the scintillator with respect to each photomultiplier tube, the method comprising the steps of:

providing a short duration pulse of light to the scintillator proximate to a given photomultiplier tube;

measuring the respective electric signals from said given photomultiplier tube and from a number of other photomultiplier tubes surrounding said given photomultiplier tube;

comparing values of said respective electric signals measured with each other and with stored values of the respective electric signals obtained when an initial calibration was done; and adjusting the effective gain of at least one tube chosen from the group of said given tube and said surrounding tubes, whereby the effective gain can be adjusted substantially independently of the intensity or quantity of light provided to said given tube.

6. Method as claimed in claim 5, wherein said at least one tube chosen is said given tube.

7. Method as claimed in claim 5, wherein the respective electric signals are to be individually read and converted into digital signals which are used to compute positions of scintillations in said scintillator, and the effective gain is adjusted by adjusting a correction value associated with each tube used during computation of said positions based on said digital signals.

8. A method of adjusting the effective gain of a plurality of photomultiplier tubes in a scintillation camera which is used for obtaining a distribution image of incident gamma rays from a subject, the camera having a scintillator for emitting flashes of light due to incident gamma rays, the plurality of photomultiplier tubes optically coupled with the scintillator for converting the light flashes into respective electric signals, the respective electric signals being individually readable, each of said plurality of photomultiplier tubes having an initial gain which is set to provide a preset level of respective electric signal when a precalibrated gamma radiation source is placed at a predetermined position near the scintillator with respect to each photomultiplier tube, the method comprising the steps of:

providing a source of gamma rays in proximity to the scintillator;

measuring values of respective electric signals emanating from a central one of said tubes nearest a scintillation event as well as of a plurality of tubes surrounding said center tube;

determining an expected value at the signal for the center tube based on the value from the surrounding tubes;

comparing the measured valve from the center tube to the expected value obtained in the previous step; and adjusting the effective gain of the center tube based on a comparison result obtained in the previous step.

9. Method according to claim 8, wherein the respective electric signals are to be individually read and converted into digital signals which are used to compute positions of scintillations in said scintillator, and the effective gain is adjusted by adjusting a correction value associated with each tube used during calculation of said positions based on the respective electric signals converted into said digital signals.

* * * * *